United States Patent
Elder

(10) Patent No.: US 10,081,416 B2
(45) Date of Patent: Sep. 25, 2018

(54) AUTONOMOUS UNDERWATER VEHICLE FOR TRANSPORT OF PAYLOADS

(71) Applicant: Raytheon Company, Waltham, MA (US)

(72) Inventor: Steven J. Elder, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/345,472

(22) Filed: Nov. 7, 2016

(65) Prior Publication Data

US 2018/0127073 A1 May 10, 2018

(51) Int. Cl.
*B63G 8/00* (2006.01)
*B63G 8/14* (2006.01)
*G05D 1/04* (2006.01)

(52) U.S. Cl.
CPC ............. *B63G 8/001* (2013.01); *B63G 8/14* (2013.01); *G05D 1/048* (2013.01); *B63G 2008/004* (2013.01)

(58) Field of Classification Search
CPC ........... B63G 8/001; B63G 8/14; G05D 1/048
See application file for complete search history.

(56) References Cited

U.S. PATENT DOCUMENTS

| 1,838,248 | A |   | 12/1931 | Bourland |
|---|---|---|---|---|
| 3,085,533 | A |   | 4/1963 | Goryl et al. |
| 3,157,145 | A | * | 11/1964 | Farris ................ B63G 8/08 114/332 |
| 4,089,492 | A |   | 5/1978 | Lang |
| 6,945,187 | B1 |   | 9/2005 | Woodall et al. |
| 7,841,289 | B1 | * | 11/2010 | Schanz ................ B63B 25/08 114/256 |
| 7,946,241 | B2 |   | 5/2011 | Sampson et al. |
| 2005/0109259 | A1 |   | 5/2005 | August |
| 2011/0000546 | A1 |   | 1/2011 | Baugh |
| 2012/0067268 | A1 |   | 3/2012 | Guerrero et al. |

(Continued)

FOREIGN PATENT DOCUMENTS

CN 203581365 U 5/2014

OTHER PUBLICATIONS

Kongsberg, Seaglider, May 2014, 2 pages.

*Primary Examiner* — Stephen P Avila

(57) ABSTRACT

An autonomous underwater vehicle (AUV) is disclosed for transporting and delivering a positively buoyant payload and/or a negatively buoyant payload to a destination. The AUV can be gravitationally propelled through the sea. The AUV can comprise a flexible vehicle body that receives a positively buoyant payload (e.g., incompressible fluid, like fuel) and can comprise a negative buoyancy component (e.g., elongated spine, electronics, cargo, etc.). A weight of the negative buoyancy component is correlated to a volume of the positively buoyant payload whereby the AUV is substantially neutrally buoyant at sea. The positively buoyant payload can be hydrostatically pressurized to hydrodynamically shape the body. The vehicle body can be collapsible for storage. The AUV can collect underwater intelligence data and transmit said data when surfacing. The AUV can loiter at sea for long periods of time. Associated system and methods are disclosed for transporting a positively buoyant payload with an AUV.

20 Claims, 4 Drawing Sheets

(56) References Cited

U.S. PATENT DOCUMENTS

2016/0068243 A1* 3/2016 Cheatham, III ....... B63G 8/001
                                                  114/321
2016/0176485 A1* 6/2016 Sylvia ................... B63G 8/001
                                                  114/330

* cited by examiner

AUTONOMOUS UNDERWATER VEHICLE FOR TRANSPORT OF PAYLOADS

BACKGROUND

Transporting and delivering fuel and other payloads to sea vessels can be complicated and costly. Typically, such delivery consists of using air drops of fuel bivets or refueling seaplanes to deliver fuel to such vessels. In one example, massive replenishment oilers or local suppliers are used to refuel sea vessels. As such, these fuel resupply methods can be dependent upon stability of overseas fuel supplies. Moreover, refueling vessels at sea is risky because the vessels are vulnerable during transport and refueling. Of course, as a supply line, refueling vessels and systems that are compromised can severely impact the operation of sea vessels.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
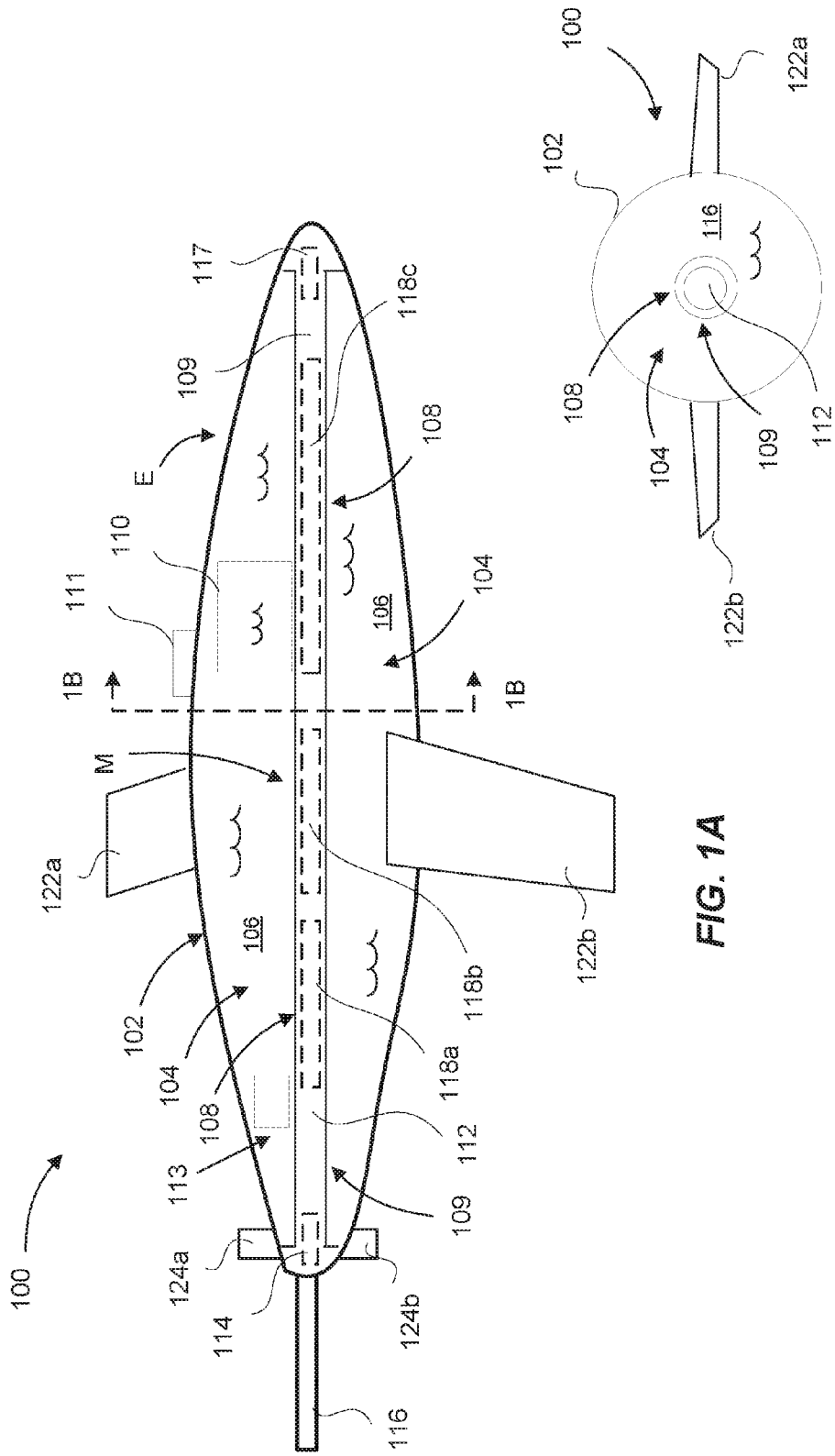
FIG. 1A shows a schematic illustration of an autonomous underwater vehicle (AUV) in accordance with one example.
FIG. 1B shows a schematic illustration of a cross section of the AUV of FIG. 1A, taken along lines 1B-1B.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example there is provided an AUV for transporting and delivering a positively buoyant payload to a destination. The AUV can comprise a vehicle body and a payload bay at least partially defined by the vehicle body. The payload bay receives and contains the positively buoyant payload (e.g., an incompressible liquid payload, like fuel). The AUV can comprise a negatively buoyant component within the vehicle body. A weight of the negative buoyancy component is correlated to a volume of the positively buoyant payload such that the AUV is substantially neutrally buoyant at sea when containing the positively buoyant payload for transport to the destination.

In one example of an AUV, the vehicle body is formed of a material comprised of a fabric material that is water impermeable and fuel impermeable in order to contain the positively buoyant payload within the payload bay. In one example, the negative buoyancy component comprises at least one structural support member for the vehicle body. The support member can comprise an elongated spine extending through a central axis of the vehicle body (e.g., from nose to tail). The elongated spine can comprise an internal cavity that receives at least one negatively buoyant payload (e.g., equipment, supplies, certain foods). Optionally, the elongated spine can comprise a substantially constant mass along its length to prevent the vehicle from oscillating during transport of the positively buoyant payload.

In one example, the AUV is sized and shaped for propulsion through the sea using gravity and lift forces, such as implemented by a "sea glider". The AUV can have a selectively controllable buoyancy control device that facilitates upward or downward lift for propulsion through the sea.

In one example, the vehicle body comprises a flexible bladder that is hydrodynamically shaped when the positively buoyant payload is hydrostatically pressurized within the payload bay. The bladder can be collapsible when empty (e.g., not having a fuel payload) to minimize the size and shape of the vehicle for storage.

In one example, the AUV comprises a computer system having a processor configured to execute instructions to cause to perform at least one of the following operations: control a delivery travel path of the vehicle to the destination; disengage vehicle propulsion for a time period; re-engage propulsion; collect intelligence data; transmit the intelligence data; and receive updated instructions for execution by the computer system.

In one example there is provided a system for transporting a positively buoyant payload with an AUV. The system can have a positively buoyant payload having a known or selected volume. A selected (e.g., a calculated) weight of the negatively buoyant component is correlated to the known volume of the positively buoyant payload such that the AUV is substantially neutrally buoyant at sea for transport of the positively buoyant payload to a destination. In one example, the positively buoyant payload comprises an incompressible fluid, such as fuel or desalinated water.

In one example there is provided a method for transporting a positively buoyant payload with an AUV. The method can comprise deploying the AUV from a departure location. The method can comprise facilitating unmanned underwater propulsion of the AUV, and then receiving the AUV at a destination for withdrawing the positively buoyant payload from the payload bay.

Figure 2:
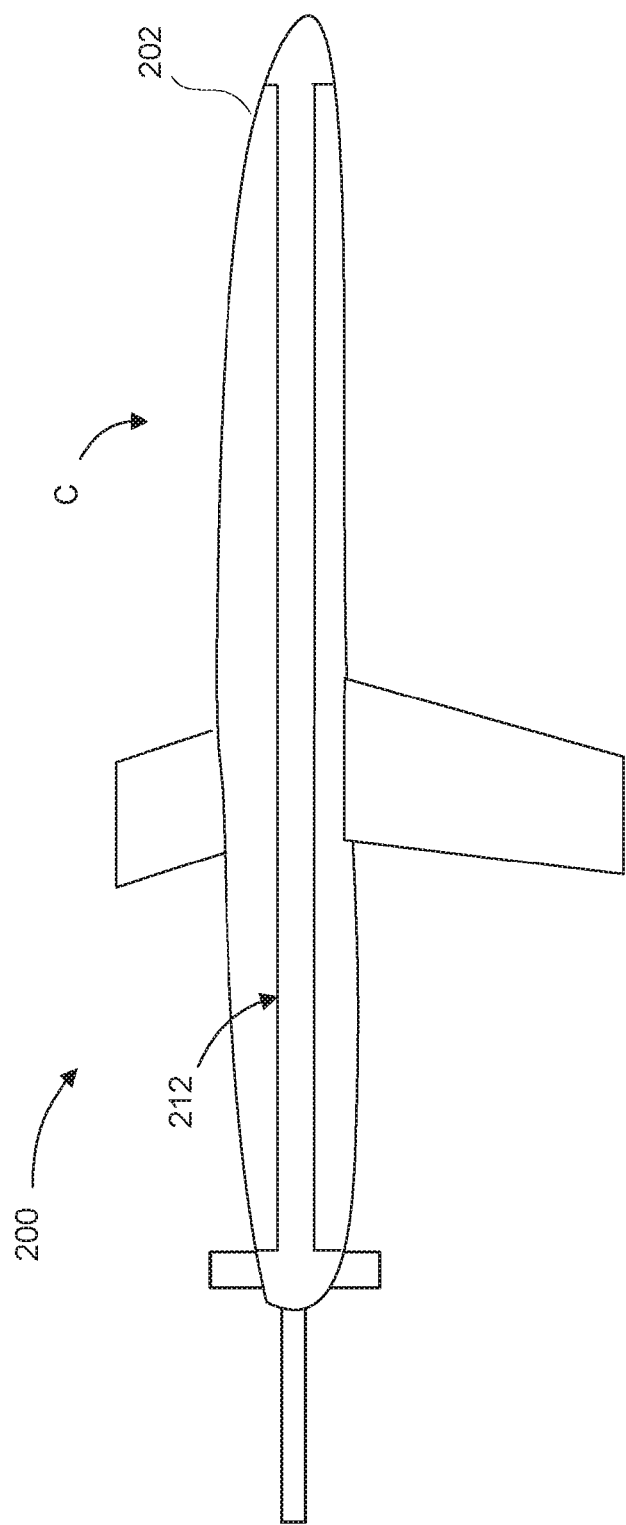
FIG. 2 shows a schematic illustration of an AUV in a collapse state in accordance with one example.

FIG. 1A shows an AUV 100 according with one example, and FIG. 1B is a cross sectional view of FIG. 1A about lines 1B-1B. FIG. 2 shows an AUV 200 in a collapsed state C, which can be the UAV 100 of FIG. 1A. It should be appreciated that FIGS. 1A, 1B, and 2 are schematic illustrations of examples of AUVs, as further discussed below, although the shape of an AUV can be substantially similar to the shape shown on FIG. 1A, or others.

More specifically, FIG. 1A illustrates the AUV 100 comprising a vehicle body 102 and a payload bay 104 within the vehicle body 102 defined at least partially by the vehicle body 102. The body 102 can be shaped similar to an ellipse, as shown, or can have a more conical shape where a rear portion has a large diameter that tapers forward toward the nose. Other shapes or configurations are also possible, and contemplated, as will be recognized by those skilled in the art. The payload bay 104 can receive a positively buoyant payload 106, such as fuel or desalinated water (or even plastic, foam, etc.), or others as will be recognized by those skilled in the art. The common feature of any positively buoyant payload that can be contained in the payload bay 104 is its "positive buoyancy" relative to the density of sea water, meaning that such payload 106 has a density that is less dense than sea water, such as JP-8 fuel, diesel oil, desalinated water, etc. Liquefied Natural Gas, LNG can be used, which has a $\rho$=430 kg/m3; however, it must be pressurized to keep it liquid (i.e., approximately to 32,000 kPa).

To achieve substantially (or absolute) neutral buoyancy in sea water (e.g., while not being propelled), the AUV 100 can comprise a negative buoyancy component 108 within the vehicle body 102 that assists to counteract the positive buoyancy imparted on the AUV 100 by the positively buoyant payload 106. As further discussed below, the negative buoyancy component 108 can comprise a number of materials, structures, devices, apparatuses, etc. that are carried by the AUV 100 and that are denser (individually and/or collectively) than the density of sea water. Therefore, and as will be further exemplified below, a weight of the negative buoyancy component 108 is correlated to a volume of the positively buoyant payload 106 such that the AUV 100 is substantially neutrally buoyant at sea while transporting the positively buoyant payload 106 to a destination (e.g., see the discussion of FIG. 3). Said another way, a volume of sea water displaced by the AUV 100 (e.g., the size of the AUV) is correlated to the density of the positively buoyant payload and the density of the negatively buoyant component, such that the average density of everything within and comprised of the AUV is equal or substantially equal to the density of the sea water it displaces while in the sea, thus making the AUV neutrally buoyant.

In one example illustrated by FIG. 2, the vehicle body 202 (and optionally vehicle body 102) comprises a flexible bladder formed of a fabric material (or other suitable material) that is fluid impermeable (e.g., water and fuel) in order to seal/contain the positively buoyant payload (e.g., 106 of FIG. 1A) when contained therein. Alternatively, the vehicle body 102 can comprise a rigid body formed from a rigid material, such as a composite or metal alloy. Specific types of material that can be used to form the vehicle body 202 (or vehicle body 102 of FIG. 1) include, but are not limited to Hypalon, PVC or silicone impregnated fabrics, and such fabrics may be, but are not limited to, fiberglass, nylon or polyester. In any event, the vehicle body 102 and/or 202 is/are designed and shaped such that the AUV has a hydrodynamic shape (e.g., a glider shaped configuration) to assist with "gliding" propulsion while at sea, as illustrated on FIG. 1A and further discussed herein.

In the example where the vehicle body is comprised of a flexible bladder, the positively buoyant payload can be hydrostatically pressurized to generate and maintain the designed glider shape of the vehicle body in an expanded (or inflated) state E. With reference to FIG. 2, when a payload bay 204 is empty (i.e., devoid of a positively buoyant payload), the vehicle body 202 can be collapsed, or can achieve a collapsed state C. As so configured, and in this state, the AUV provides a relatively small and lightweight AUV (relative to the amount of payload it can carry) because a collapsed AUV 200 would only comprise the weight of the body 202 and any devices or objects attached thereto and contained therein. Thus, a collapsed AUV 200 is ideal for storage when empty because its storage "footprint" is relatively small and its weight is light as compared to its footprint and weight when expanded and filled with a positively buoyant payload. In one aspect, the foils and fins of the AUV can be configured to be manipulated into a storage configuration or position because they are coupled to a flexible bladder body 202 that can be manipulated.

Referring again to FIGS. 1A and 1B, in the example of the vehicle body being comprised of a rigid material (and having the body shape if FIG. 1A, for instance), at least one bay or container 110 can optionally be supported in (or otherwise coupled to) the vehicle body, as shown by the dashed lines in the payload bay 104. The container 110 can be a flexible bladder, a rigid container, or other container to hold a positively buoyant payload, such as a liquid (e.g., fuel). Accordingly, a plurality of such internal containers 110 can be supported within and transported by the AUV 100. Each container can have the same or a different positively buoyant payload contained therein (e.g., one container could have a fuel payload and the other container can have a desalinated water payload). Likewise, if the vehicle body is a flexible bladder, then multiple flexible bladders can be contained in the AUV and can carry different liquids, for instance. The vehicle body 102 can further be partitioned, or comprise one or more partitions that divide the vehicle body 102 into different sections, each being able to receive and hold a positively buoyant payload.

The negative buoyancy component 108 can comprise a structural support member such as an elongated spine 109 that extends longitudinally and internally along the vehicle body 102 and that structurally supports the vehicle body 102 (e.g., in one example the spine 109 can support a flexible bladder type vehicle body). The spine 109 can be comprised of a material that is denser than the density of sea water (at any depths in the sea), such as most metals and some composite materials. The negative buoyancy component 108 can comprise a plurality of structural support members (not shown), such as trusses, ribs, spines, etc., secured to and extending from the elongated spine. These can function provide shape and additional support to the vehicle body 102.

In one example, the elongated spine 109 can be primarily comprised of a rigid material (e.g., aluminum alloy) having a solid cross sectional area along all or most of the length of the spine 109. This "solid metal" elongated spine would effectively act as a longitudinally uniform mass within the AUV to counteract the positive buoyancy of the positively buoyant payload 116. In any event, the elongated spine 109 can be configured to extend all or a portion of a length of the body 102 to provide a constant or substantially constant mass and density along the length of the vehicle body 102. Among other things, the elongated spine 109 can help stabilize the AUV 100 during transport by counteracting the tendency of the AUV to oscillate as it is in motion.

In one example, the elongated spine 109 can comprise an internal cavity 112 (e.g., FIG. 1B) that receives at least one negatively buoyant payload or other components, objects. The internal cavity 112 is shown schematically on FIG. 1A for purposes of clarity. However, FIG. 1B shows that the internal cavity 112 can be a hollow center of a pipe or tube of the elongated spine 109. The internal cavity 112 can contain a variety of negatively buoyant payloads and components, such as electronics components or modules or other devices for on-board use (or those for transport to be offloaded for external use). For instance, section 114 at the rear of the body 102 can comprise communication equipment, such as a GPS, or other transmitter/receiver devices, etc. used for sending and receiving communications to an external device or system, such as a satellite, radio tower, etc. when the AUV 100 surfaces. Such communications can be transmitted via an antenna 116 secured to the rear area of the body 102. Likewise, section 117 near the front of the body 102 can include on-board electronic devices, such as navigation and control systems, which can be electrically coupled to and in communication with the devices and components of section 114. Such electronic devices in sections 114 and/or 117 can be secured or mounted internally to the spine 109, or to the vehicle body at either end of the spine 109, in any suitable manner. A battery source can also be contained in one or both sections 114 and/or 117 (or at any other location within the vehicle body 102) for powering the on-board electronic and other components or systems. The spine 109 can be secured to the body 102 by any suitable means. In one example, the spine 109 can be secured to the vehicle body 102 using fasteners. In another example, the spine 109 can be secured to the vehicle body 102 by vulcanizing the spine 109 to the vehicle body, such as vulcanizing a flexible bladder vehicle body to a rigid aluminum spine.

In the example of the elongated spine 109 having the internal cavity 112, the negatively buoyant component 108 can further comprise negatively buoyant payloads contained in separate sections 118a-c of the internal cavity 112 for transport and delivery of various payloads. For instance, section 118a can be a separate container held in the cavity 112 that contains food products (e.g., emergency food/water supplies), and section 118b can contain medical supplies, and section 118c can contain military equipment (e.g., ammunition, radios, gear, etc.). These sections can be accessed through a hatch (not shown) formed within the vehicle body 102 at any suitable location on the vehicle body 102, such as through the nose, tail, or anywhere along the spine. These sections 118a-c can be pressurized to account for pressurization needs of certain payloads, such as medical supplies and food stuffs. Likewise, the positively buoyant payload 106 being a fuel payload, for example, can be dispensed into (and out of) the payload bay 104 through a hatch or valve 111 coupled to the body 102 that is suitable for internal access of underwater vehicles (such as external hatches used on submarines, or port/fuel valves used on fuel bivets).

A pair of foils 122a and 122b can be supported about an exterior of the vehicle body 102. The foils 122a and 122b can be configured to be supported about and extend laterally and outwardly from the body 102 or from spine 109. Likewise, a pair of rear fins 124a and 124b can be supported about the vehicle body 102, and configured to extend from a rear of the body 102. In this example, the foils 122a and 122b are positioned proximate to or near a center of buoyancy M of the AUV 100. Existing sea gliders that are "information gathering" (i.e., that do not transport payloads) have side foils that are closer to a rear of a vehicle body. Foils 122a and 122b are positioned in this way because, as the AUV 100 is designed to deliver a relatively large volume of a payload (like fuel), a center of buoyancy will generally be proximate or near the center (horizontally and vertically) of the vehicle body 102 of the AUV 100. Thus, the foils 122a and 122b are positioned this way to assist with "gliding" propulsion of the vehicle through the sea, and also assist to prevent AUV from oscillating during transport of a payload. The specific configuration and positioning of the foils 122a, 122b and the fins 124a, 124b shown is not intended to be limiting in any way. Indeed, these can vary depending upon the size and configuration of the vehicle body, the size and configuration of the various positive and negative buoyancy payload components, the actual payloads being delivered, etc., as will be recognized by those skilled in the art.

The AUV 100 can have a propulsion control device/system configured to assist with propulsion of the AUV 100 through the sea. In one example, the AUV 100 can be a sea glider, which can have a propulsion control device/system 113. For example, the propulsion control device/system 113 can comprise a bladder proximate the tail area of the AUV 100 that is inflated to provide slightly positive buoyancy about the tail area that causes the AUV 100 to pitch and to be pointed downward toward the sea. Such downward direction, coupled with the shape of the AUV 100 and the shape and orientation of the foils 122a and 122b, causes lift in a downward direction that propels the AUV 100 through the sea (as known in the industry). When the AUV 100 reaches its lowest position in the sea (as programmed in an on-board control system), the bladder can be deflated, thereby causing the nose area of the AUV 100 to pitch upward or to be pointed upwardly, which creates upward lift of the AUV 100 to propel it through the sea (similarly to the downward lift). Optionally, as known in the industry, the propulsion control device/system 113 can comprise a plurality of batteries rotationally coupled about a central axis member (e.g., the spine 109) of the AUV 100. In this manner, the batteries can be rotated (by an electric motor having a gear system) in clockwise and counter clockwise directions to control the "roll" of the AUV 100 to control the turn (left and right) of the AUV 100 as it travels through the sea. The batteries can also be axially movable between the nose and tail directions (by the electric motor) to cause upward or downward directional pitch control of the AUV 100 (in concert with the inflatable bladder). Thus, during propulsion through the sea, the AUV 100 can be slightly positively or negatively buoyant depending on the control of the components (bladder, batteries, etc.) of the propulsion control device/system 113. Notably, throughout the present disclose when referencing a "substantially neutral buoyant" AUV, this can mean that the AUV is not moving upwardly or downwardly in the sea (i.e., with the assistance of a propulsion control device). In other words, the AUV 100 can be substantially neutrally buoyant by virtue of a fuel payload (for instance) and the counteracting negatively buoyant component(s). Of course, as known in the industry, the AUV can be slightly negatively or positively buoyant to cause downward or upward lift (respectively) for propulsion, as discussed herein. By "slightly", this means that the bladder can be inflated or deflated just enough to lift or drop the nose of the AUV, which would impart a small amount of positive or negative buoyancy to the AUV to assist with propulsion.

In a specific example, assume 1000 gallon of JP-8 fuel is required for transport and delivery by an AUV. Such volume of fuel would have a weight of approximately 4577 kilograms and a positive buoyancy of approximately 1144 kilograms. Thus, the vehicle's cargo deadweight (DWT) would be 4577 kilograms. In this example, a vehicle body may be approximately 2 meters in length (shaped as an ellipsoid) and would have a vehicle body volume of approximately 5.6 m³. Further assume that: the body has a mass/area of 1.0 kilograms/m²; the foils/fins weigh 10 kilograms; a neg. cargo bay (e.g., the spine) weighing 100 kilograms, and the on-board electronics weigh 10 kilograms. As the body would weigh approximately 26 kilograms, the total vessel lightweight (LWT) cargo would be approximately 146 kilograms. The above calculation results in a "cargo weight to vessel weight" ratio of approximately 41:1.

Another advantage of the disclosed AUV in this calculated example is that Deadweight coefficient ($C_D$) is near 1.0 (1.0 being absolute/unachievable efficiency). More specifically, the $C_D$ of the AUV in this example can be approximately 0.977. $C_D$=DWT/Displacement. Displacement is the sum of the DWT & LWT. Here, there is a substantial reduction in both DWT and LWT of the AUV as compared to existing fuel delivery vessels. This is because the AUV has none of the typical DWT of a cargo vessel, such as power train/fuel systems, crew and support, ballasts, etc. Thus, as in the example, the DWT (volume of JP-8 fuel) is almost equal to the amount of displacement of the sea water (because the LWT imparts very little displacement compared to that of the DWT/fuel cargo). Thus, the $C_D$ is near 1.0, being approximately 0.977 in the calculated example above. This is a major improvement over existing vessels that deliver fuel, for instance, because oil tankers typically have a $C_D$ that is 0.860 (on the high end), which is possibly the highest known $C_D$ for a fuel delivery vessel (other cargo ships typically have a $C_D$ that is below 0.860).

Replacing JP-8 fuel with diesel oil will result in approximately the same ratio, in the above calculation example. In other examples, said ratio can be a range between 20:1 and 40:1 for situations where a negatively buoyant cargo is also carried, for instance. This "cargo weight to vessel weight" is a significant improvement over existing fuel delivery vehicles, particularly for an autonomous underwater vehicle.

In another specific example, assume a 25 M gallon (DWT) of desalinated water payload is selected for transport and delivery by an AUV. Such volume of water would have a positive buoyancy of approximately 2.13E+07 kilograms. Therefore, a vehicle body volume would need to be approximately 851,718 m³. Further assume that: the body has a mass/area of 1.0 kilograms/m²; the foils/fins weigh 2000 kilograms; the neg. cargo bay (spine) weighs 2000 kilograms; and the on-board electronics weigh 500 kilograms. The body could weigh approximately 68,544 kilograms, which would mean the LWT would be about 73,000 kilograms. Thus, the "cargo weight to vessel weight" ratio would be approximately 91,800:1, and the $C_D$ would be approximately 0.999989. Although this may result in a very large AUV (but smaller than a tanker), it would be cost effective compared to existing methods of delivering fresh water with a tanker.

As exemplified with the above specific examples carrying an incompressible fluid payload (e.g., a fuel), a weight of the negative buoyancy component (e.g., deadweight, such as body, spine, electronics) is correlated to a volume of the positively buoyant payload (e.g., gallons of fuel) such that the AUV is substantially neutrally buoyant at sea when containing the positively buoyant payload for transport to a destination. Formulas to calculate neutral buoyancy of an AUV are known and will not be described in detail herein. As exemplified above, other factors are correlated between the positively buoyant component and the negatively buoyant component, such as: the buoyancy and the weight of the particular fuel being transported, the mass/area of the vehicle body and all its components devices therein and attached thereto, and others.

Figure 3:
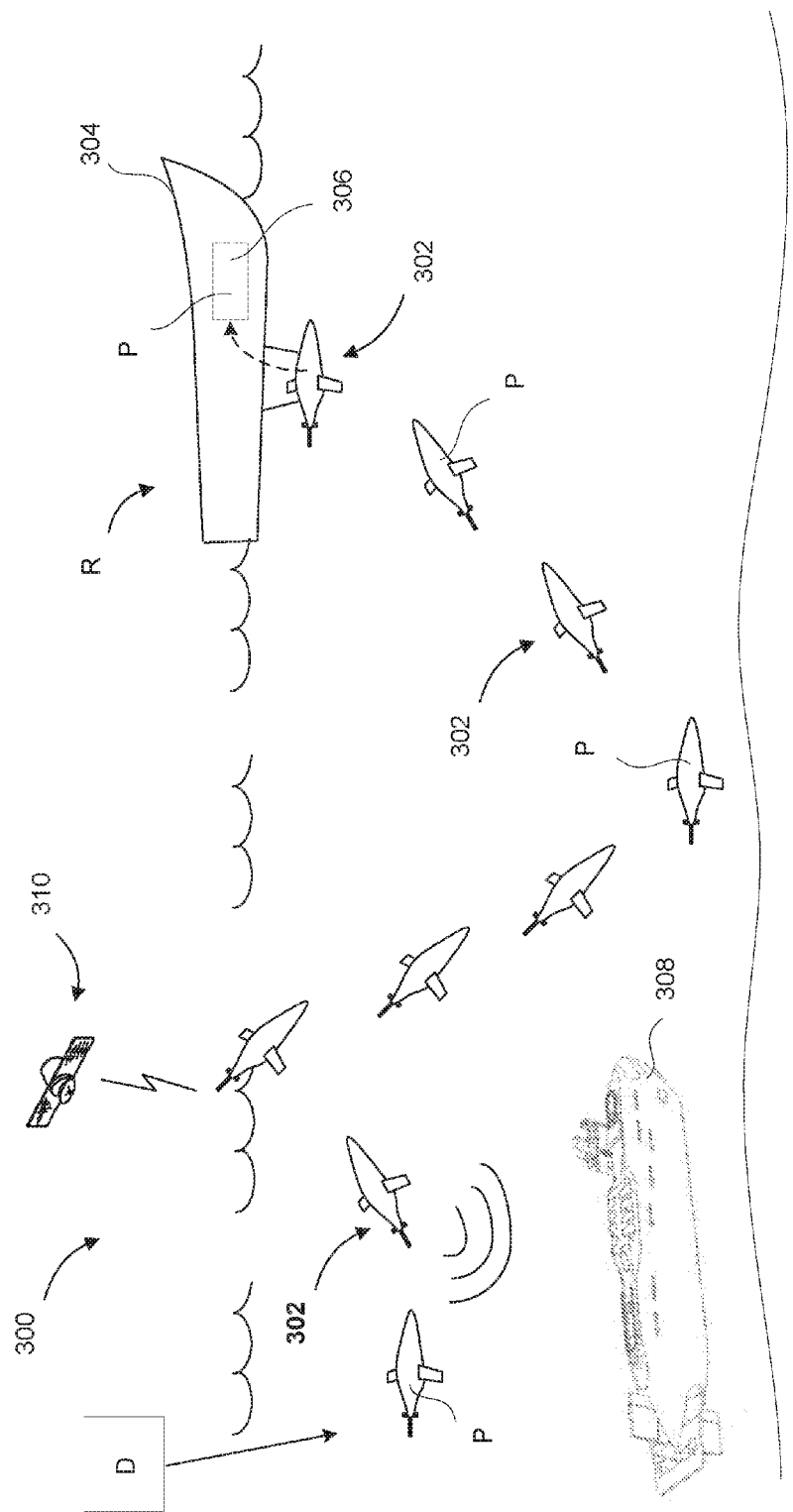
FIG. 3 shows a schematic illustration of a system and method for transporting a payload with an AUV in accordance with one example.

FIG. 3 illustrates systems and methods (collectively "300") associated with transport and delivery of a payload P with an AUV 302, such as the AUVs described with reference to FIGS. 1A-2. In FIG. 3, the AUV 302 is configured in the form of a glider shaped to create lift. The AUV further comprises a buoyancy altering device or system (e.g., one similar to those discussed above as part of the propulsion control system 113 of FIG. 1A) to assist in generating upward or downward lift to propel the AUV through the sea (e.g., at about 0.5 knots). The buoyancy altering device or system can be part of the on-board electronics described regarding FIG. 1A, or it can be a separate system. As known in the industry, a "sea glider" is an underwater vessel propelled with the assistance of gravity, as discussed above. Upon deployment in the sea, by initially being slightly negatively buoyant (e.g., by manipulating a similar buoyancy control device as the buoyancy control device 113 of FIG. 1A), the glider slowly sinks. The glider is shaped to create lift as it sinks (i.e., as a result of the shape of the body and the foils). The force of lift and the force of falling (sinking) in concert create a glide slope, which is equal to the lift-to-drag ratio. When the glider has reached the greatest depth of decent, a small buoyancy bladder (e.g., one similar to that described above as part of the device 113 of FIG. 1A) can be inflated (or ballast can be dropped axially along the AUV) which gives the glider very small positive buoyancy. At this phase in the transit, the AUV actively inverts itself. Foils on the AUV 302 (e.g., like the foils 122a and 122b of FIG. 1A) can also actively change the angle of incidence. Both actions can change the lift characteristics, thereby creating downward lift. This downward force creates an inverted glide slope in the opposite/upward direction, as further discussed with reference to FIG. 1A. Therefore, a sea glider can be propelled at sea for many months on just a handful of small power batteries, such as six 1.5V batteries. Specifically regarding FIG. 3, although the AUV 302 is shaped like a glider, it can be scaled much larger than a known 6-9 foot sea glider in order to transport thousands of gallons of fuel and/or hundreds of kilograms of cargo, for example.

In one example, the AUV 302 can be deployed from a departure location D for delivery of the payload P to the destination R. The destination R can be a vessel 304 at sea that captures or on-boards the AUV 302 for use as a fuel bivet, for instance. In this case, the payload P (e.g., fuel) contained in the AUV 302 is drained into a fuel tank 306 on the vessel, which can be achieved by known methods of draining a fuel bivet into a vessel. While the specific destination R shown in FIG. 3 is a vessel, the destination R can be any destination or rendezvous point, such as a helicopter, airplane, island/land/port, submarine, etc., where the payload(s) of the AUV may be offloaded. In another situation, the AUV can arrive at the destination R for subsequent transport to another location for fuel delivery. Likewise, the departure location D can be any initial or intermittent deployment location (e.g., deployment from a vessel, helicopter, airplane, island/land/port, submarine, etc.). In one example, the AUV 302 has a propulsion control device (e.g., one similar to the propulsion control device 113 discussed above with reference to FIG. 1A) configured to facilitate propulsion of the AUV 302 through the sea to the destination R. The propulsion control device can be the aforementioned glider propulsion device, and/or it can be a powered propulsion system that utilizes batteries/fuel, propellers, water jets, manipulateable or moving fins/foils, etc., these being supported onboard the AUV as commonly known.

In one example, the UAV 302 can further be used for gathering and transmitting intelligence while transporting a payload (or otherwise while at sea). For instance, the UAV 302 can have sonar (or other systems) that collect information (e.g., regarding other underwater vehicles 308), or to monitor underwater activity. In this case, the UAV 302 can have an on-board computer system that is programmed to cause the AUV 302 to surface and transmit the collected information to a satellite(s) 310, for example. In this example, the computer system can be electrically coupled to a propulsion control device (e.g., one similar to the control device 113 of FIG. 1A) to control the components of the propulsion control device. That is, an inflatable bladder can be caused to be inflated or deflated, as discussed above, by an air pump, compressed air canister, or other suitable device. Likewise, the batteries can be caused to be rotated (radially) or translated (axially) by the computer system via an on-board electric motor, to assist with propulsion of the AUV, as discussed above. The AUV 302 can also receive instructions from the satellite 310 (or other communication system) that can reprogram the on-board computer system, such as providing instruction to cause the AUV to travel to an alternative destination point. In addition, upon surfacing, the AUV 302 can collect and transmit information to and from surface and/or air vehicles (water vehicles, aerial vehicles, land vehicles, etc.), for instance. As a glider, the AUV 302 would have very low noise operations underwater, which means it would have high S/N for data collection. This allows the AUV to be operated covertly or in stealth when collecting intelligence data and when delivering fuel, for example, which can be quite advantageous during situations where intelligence gathering is critical and where fuel delivery can be risky.

In one example, the AUV 302 can have a computer system having a processor that is programmed to execute instructions that cause disengagement of propulsion for a predetermined time period, and then that causes re-engagement of propulsion to reach the destination R. For instance, the AUV 302 can "loiter" at a position near the sea floor for long periods of time (e.g., months, or even years) until needed or "called upon" (as shown by a lower-most AUV on FIG. 3). In this case, the computer system can cause nearly absolute neutral buoyancy such that the AUV 302 is not inverted upwardly or downwardly, thereby disengaging propulsion. The AUV 302 may also be made negatively buoyant and rest upon the sea floor until signaled (e.g., by another vehicle/system), or until scheduled as programmed in the on-board computer system. In any event, these methods can be achieved by the computer system controlling the buoyancy control system, such as controlling the thin bladder or ballast to be in a neutral position to effectuate said nearly absolute neutral buoyancy of the AUV. Of course, such control over buoyancy will depend on the depth of the AUV because of differing salinity levels at different sea depths.

Figure 4:
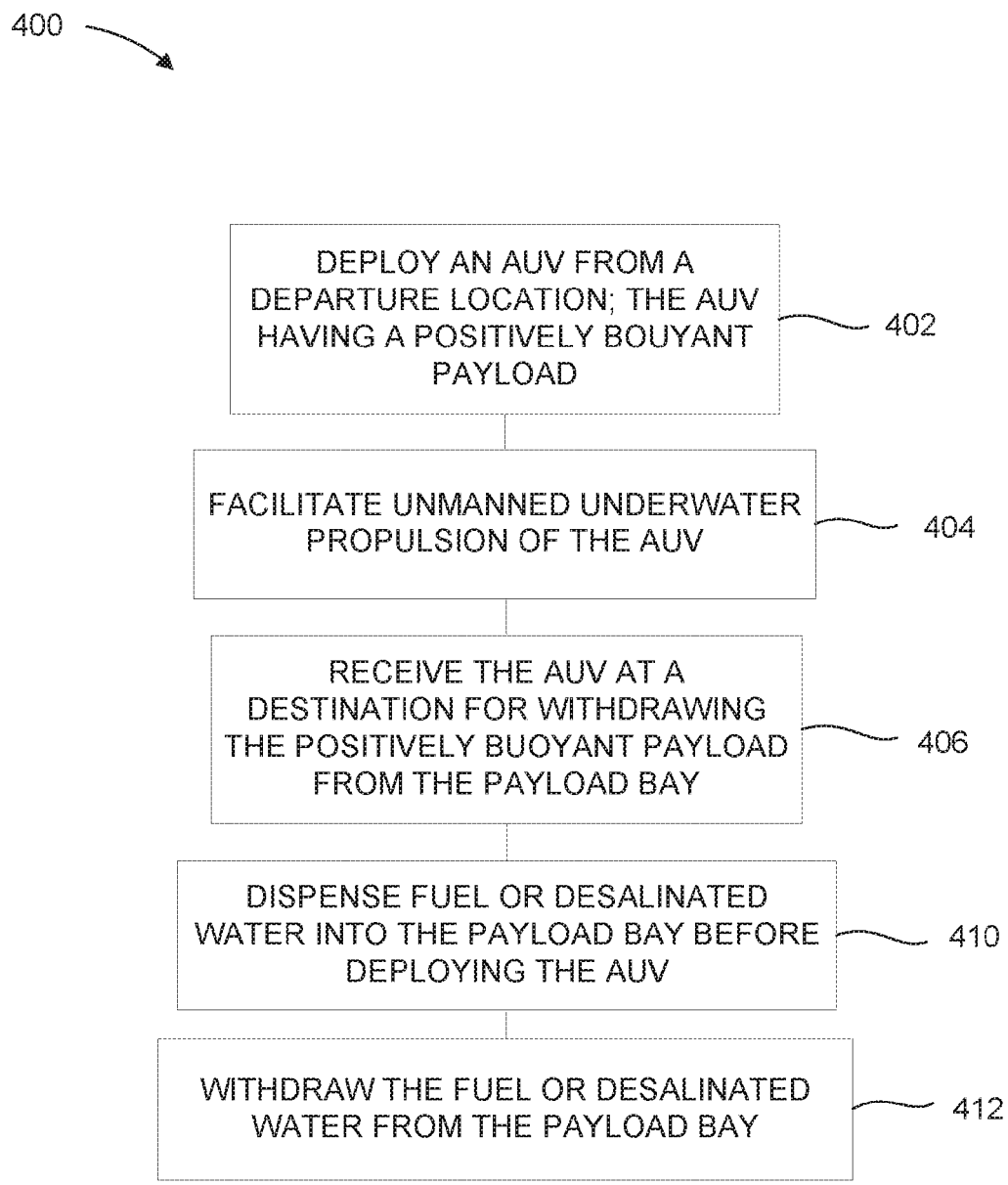
FIG. 4 shows one method of transporting a payload with an AUV in accordance with one example.

FIG. 4 illustrates one example of a method 400 for transporting a positively buoyant payload with an AUV. The method 400 can comprise step 402 of deploying an AUV from a departure location. The AUV can comprise some or all of the examples discussed regarding FIGS. 1A-3 such that a selected weight of the negative buoyancy component is correlated to the known volume of the positively buoyant payload, and such that the AUV is substantially neutrally buoyant at sea. Step 404 can comprise facilitating unmanned underwater propulsion of the AUV, which can be achieved as discussed regarding glider/gravitational propulsion or by a powered propulsion system programmed to cause propulsion of the AUV. Step 406 can comprise receiving the AUV at a destination for withdrawing the positively buoyant payload from the payload bay. This can be achieved as discussed regarding FIG. 3, for example. Step 408 can comprise dispensing an incompressible fluid (e.g., fuel or desalinated water) into the payload bay (i.e., before deploying the AUV). And step 410 can comprise withdrawing the incompressible fluid from the payload bay, which can be achieved as discussed regarding FIG. 3, for example. Although not illustrated in FIG. 4, the method 400 can optionally include installing negatively buoyant component(s) (i.e., cargo) into the AUV (e.g., into the spine), and then removing such cargo upon receiving the AUV at the destination, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various sections thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, sections, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An autonomous underwater vehicle (AUV) for transporting a positively buoyant payload, the AUV comprising:
    a vehicle body;
    a payload bay defined at least partially by the vehicle body and that receives a positively buoyant payload;
    a negative buoyancy component within the vehicle body, the negative buoyancy component comprising at least one structural support member; and
    wherein a weight of the negative buoyancy component is correlated to a volume of the positively buoyant payload such that the AUV is substantially neutrally buoyant at sea when containing the positively buoyant payload for transport to a destination.

2. The vehicle of claim 1, wherein the payload bay is formed of a material comprised of fabric that is water impermeable and fuel impermeable to contain the positively buoyant payload within the payload bay.

3. The vehicle of claim 1, wherein the at least one structural support member is comprised of a rigid structure.

4. The vehicle of claim 1, wherein the at least one structural support member comprises an elongated spine extending through a central axis of the vehicle body.

5. The vehicle of claim 4, wherein the elongated spine comprises an internal cavity that receives at least one negatively buoyant payload.

6. The vehicle of claim 4, further comprising electronics components supported within the elongated spine.

7. The vehicle of claim 4, wherein the elongated spine comprises a substantially constant mass along its length to prevent the vehicle from oscillating during transport of the positively buoyant payload.

8. The vehicle of claim 1, wherein the AUV is a glider sized and shaped for gravitational propulsion through the sea, and wherein the vehicle has a selectively controllable buoyancy control device that facilitates upward or downward lift for propulsion through the sea.

9. The vehicle of claim 1, wherein the vehicle body comprises a flexible bladder that is hydrodynamically shaped when the positively buoyant payload is hydrostatically pressurized within the payload bay.

10. The vehicle of claim 1, wherein the vehicle body comprises a flexible bladder that is collapsible when empty to minimize the size and shape of the vehicle for storage.

11. The vehicle of claim 1, further comprising a computer system having a processor configured to execute instructions to cause to perform at least one of the following operations:
    control a delivery travel path of the vehicle to the destination;
    disengage vehicle propulsion for a time period;
    re-engage propulsion;
    collect intelligence data;
    transmit the intelligence data; and
    receive updated instructions for execution by the computer system.

12. The vehicle of claim 1, wherein a cargo weight to vessel weight ratio of the vehicle is between at 20:1 and 41:1, and wherein the vehicle's deadweight coefficient is at least 0.900.

13. The vehicle of claim 1, wherein a combined weight of the negative buoyancy component and the vehicle body is substantially the same weight as the positively buoyant payload.

14. A system for transporting a positively buoyant payload with an autonomous underwater vehicle, the system comprising:
    a positively buoyant payload having a known weight; and
    an autonomous underwater vehicle (AUV) comprising:
        a vehicle body;
        a payload bay defined at least partially by the vehicle body, the payload bay containing the positively buoyant payload;
        a negative buoyancy component within the vehicle body, the negative buoyancy component comprising at least one structural support member;
        wherein a selected weight of the negative buoyancy component is correlated to the known weight of the positively buoyant payload such that the AUV is substantially neutrally buoyant at sea for transport of the positively buoyant payload to a destination.

15. The system of claim 14, wherein the positively buoyant payload comprises an incompressible fluid that is positively buoyant relative to sea water.

16. The system of claim 14, wherein the negative buoyancy component comprises an elongated spine extending along the vehicle body and having an internal cavity containing at least one negatively buoyant payload.

17. The system of claim 14, wherein the vehicle is a glider sized and shaped for gravitational propulsion through the sea, and comprises a selectively controllable buoyancy control device that facilitates upward or downward lift for propulsion through the sea.

18. The system of claim 14, further comprising at least one container carried within the vehicle body and defining the payload bay.

19. A method for transporting a positively buoyant payload with an autonomous underwater vehicle, the method comprising:
    deploying an autonomous underwater vehicle (AUV) from a departure location, the AUV comprising:
        a vehicle body;
        a positively buoyant payload having a known weight;
        a payload bay defined at least partially by the vehicle body, the payload bay containing the positively buoyant payload;
        a negative buoyancy component within the vehicle body, the negative buoyancy component comprising at least one structural support member;
        wherein a selected weight of the negative buoyancy component is correlated to the known volume of the positively buoyant payload such that the AUV is substantially neutrally buoyant at sea;
    facilitating unmanned underwater propulsion of the AUV; and
    receiving the AUV at a destination for withdrawing the positively buoyant payload from the payload bay.

20. The method of claim 19, further comprising dispensing an incompressible fluid into the payload bay, and withdrawing the incompressible fluid from the payload bay.

* * * * *